United States Patent [19]

Dimick et al.

[11] Patent Number: 4,509,966

[45] Date of Patent: Apr. 9, 1985

[54] WALL-FLOW MONOLITH FILTER WITH POROUS PLUGS

[75] Inventors: David L. Dimick, Birmingham; Kenneth B. Bly, Pontiac; Otto A. Ludecke, Rochester, all of Mich.

[73] Assignee: General Motors Corporation, Detroit, Mich.

[21] Appl. No.: 495,579

[22] Filed: May 18, 1983

[51] Int. Cl.³ .............................................. B01D 39/20
[52] U.S. Cl. ........................................ 55/502; 55/523; 55/DIG. 30; 422/180
[58] Field of Search ................ 55/502, 523, DIG. 10, 55/DIG. 30; 60/311; 422/179, 180; 428/116–118; 210/510.1

[56] References Cited

U.S. PATENT DOCUMENTS

| | | | |
|---|---|---|---|
| 3,788,486 | 1/1974 | Bergstrom | 210/496 |
| 4,283,210 | 8/1981 | Mochida et al. | 55/523 |
| 4,363,644 | 12/1982 | Sato et al. | 55/DIG. 30 |
| 4,364,761 | 12/1982 | Berg et al. | 55/523 |
| 4,417,908 | 11/1983 | Pitcher, Jr. | 60/311 |
| 4,441,899 | 4/1984 | Takagi et al. | 55/DIG. 30 |

FOREIGN PATENT DOCUMENTS

| | | | |
|---|---|---|---|
| 42301 | 12/1981 | European Pat. Off. | 55/523 |
| 2071640 | 12/1981 | United Kingdom | 428/116 |

*Primary Examiner*—David L. Lacey
*Attorney, Agent, or Firm*—Arthur N. Krein

[57] ABSTRACT

A through flow exhaust particulate filter element of the type including a ceramic monolith structure having a plurality of thin interlaced gas filtering porous internal walls defining a plurality of parallel passages extending to opposite inlet and outlet ends thereof, said passages including a first group comprising inlet passages open at said inlet end of the element and closed by plugs at the outlet end and a second group comprising outlet passages closed by plugs at said inlet end and open at said outlet end, the plugs of the outlet passages at the inlet end of the element being of a ceramic porous material corresponding in porosity substantially to that of the porous internal walls whereby exhaust gases can flow therethrough so that particulates will be trapped by these porous plugs to thus permit flame travel along these plugs to adjacent inlet passages during incineration of collected particulates on the filter element.

4 Claims, 9 Drawing Figures

WALL-FLOW MONOLITH FILTER WITH POROUS PLUGS

This invention relates to exhaust particulate filters for use in the exhaust systems of diesel engines and the like and, in particular, to a ceramic wall-flow monolithic filter with porous plugs.

BACKGROUND OF THE INVENTION

Considerable interest has recently been focused on the problem of limiting the mass of particulate matter emitted with the exhaust gases from diesel and other internal combustion engines. In the case of diesel engines, a great deal of effort is currently being expended to develop practical and efficient devices and methods for reducing emission of particulates in exhaust gases.

One method for accomplishing this is to provide a suitable particulate trap in the exhaust system of a diesel engine, the trap having at least one filter positioned therein which is capable of efficiently trapping the particulates from the exhaust gases and which is also adapted to be regenerated as by the in-place incineration of the trapped particulates collected thereby.

A ceramic wall-flow monolith particulate filter of the type disclosed, for example, in U.S. Pat. No. 4,364,761 entitled "Ceramic Filters For Diesel Exhaust Particulates and Methods of Making", issued Dec. 21, 1982 to Morris Berg, Carl F. Schaefer and William J. Johnston, has emerged as a preferred form of such a filter device.

Such a ceramic wall-flow monolith particulate filter includes an outer wall interconnected by a large number of interlaced, thin porous internal walls which define a honeycomb structure to provide parallel channels running the length thereof. Alternate cell channel openings on the monolith face are blocked and, at the opposite end the alternate channel openings are blocked in a similar manner but displaced by one cell whereby to define inlet channels and outlet channels.

With this filter arrangement, the exhaust gas cannot flow directly through a given inlet channel but is forced to flow through the separating porous walls into an adjacent outlet channel. The exhaust gas is thus filtered as it flows through the porous walls between adjacent channels.

As this type ceramic filter is presently manufactured, the ceramic walls thereof are fabricated by extrusion and then fired. After firing, the alternate channel openings are suitably sealed, as by being plugged with a non-porous material, to provide the structure described hereinabove with a plurality of inlet channels and a plurality of outlet channels arranged in checkerboard fashion.

Such a ceramic filter device is suitably located in the engine exhaust system of a vehicle so as to remove particulates from the exhaust gases by trapping of the particulates on the walls of the inlet passages or channels separating them from their associate adjacent outlet channels.

The filter will, with use, then become clogged with the carbonaceous material. The diesel particulates will increase the backpressure in the exhaust system of the diesel engine. It is thus necessary to remove the diesel particulates from the filter from time to time to prevent the deleterious effect on engine performance due to high backpressure.

The carbonaceous particulates, thus collected, can be removed from the filter by raising the temperature of the inlet gas to the particulate ignition temperature to effect incineration thereof. The carbonaceous particulate when produced from normal diesel fuel, that is, D-2 diesel fuel, will ignite if the temperature is raised to approximately 600° C. in the presence of 15%–18% oxygen.

However, as is well known, a diesel engine achieves exhaust temperatures of this magnitude only under very severe engine loading conditions. Therefore, a supplementary source of heat to rise the exhaust inlet temperature to the wall flow ceramic filter is normally necessary. This usually requires the use of a relatively costly heat source, such as a fuel burner or an electrice resistance heater, in series with the exhaust flow to raise the temperature of the gases to approximately 600° C.

It is also known in the art, that fuel additives, such as copper napthtenate, copper acetate, tetraethyl lead and manganese (MMT), in the diesel fuel will reduce the ignition temperature of diesel particulates to approximately 320° C.–420° C. The quantity of the additive content in the fuel has normally been from about 0.05 gm/gal to 0.75 gm/gal to effect this desired reduction of ignition temperature of the particulates.

It is also known that the particulates, from such treated diesel fuel, that are deposited on a fairly low heat conductive surface, whether it is metallic in nature or ceramic, can be ignited in a small area, for example, less than 1 mm diameter, by glowing engine sparks, electric arc, or a small pin point torch type fuel burner. After ignition, the particulate (using the above described metallic additives in the fuel) buring will readily propagate over those sufaces of the filter on which the particulates have been deposited.

As described above, the fuel additive normally will reduce the ignition temperature of the particulates to as low as 320° C. depending on the additive and concentration used. In addition, the burning of a small portion of the particulate causes continuous layers to ignite and the combustion propagates. It is presumed that the metallic additive after having been exposed to the engine combustion process is throughly oxidized. These oxidized metallic particulates are throughly dispersed in the carbonaceous particulates. When the temperature of this dispersion is locally raised in temperature, then an exothermic reaction occurs. The oxygen molecules in the metal oxide freely combines with the carbon to form $CO$ and $CO_2$. The reaction produces a large quantity of energy and increased gas temperature which causes continuous ignition of the surrounding layers of the metal oxide-carbon dispersion.

When a wall flow ceramic monolith filter is to be regenerated, it is thus desirable, from a cost standpoint, to ignite only a small area of the face of the monolith. However, a conventional ceramic type filter monolith, with plugs of non-porous material, is not operative so as to permit particulates to collect on the inlet face thereof. Instead the particulates are only collected on the walls of the filter inlet channels. In order to insure complete regeneration, it is almost normally necessary that each channel be ignited on an individual basis. This latter statement is not entirely true in fact, because spot ignition in several inlet channels can and will propagate from channel to channel due to the heat generated in the long passages. However, this propagation generally occurs only toward the rear or discharge end of the filter and, accordingly, the front or inlet end portion of filter will still contain unburned particulates.

SUMMARY OF THE INVENTION

The present invention relates to an improved cellular ceramic monolith diesel particulate filter having at least the outlet channels at the inlet end of the filter partly closed by means of a porous material. This porous material in the form of individual plugs or in sheet form permits the inlet surface end of the filter to function as a filter causing the carboneous material, i.e., particulates, to be deposited on the inlet surface of this material. Accordingly, the particulates on the inlet face of the filter need only to be suitably ignited in a small spot and this particulate burning can then progress across the inlet face of the filter thereby igniting the particulates in all inlet channel in the ceramic filter to effect complete regeneration of the filter.

It is therefore a primary object of this invention to provide an improved ceramic, wall-flow monolith particulate filter having a plurality of inlet channels and outlet channels separated by porous walls wherein at least the outlet channels at the inlet end of the filter are partly closed by porous material whereby particulates will collect on the inlet surface thereof so as to enhance the propagation of a flame thereon to adjacent inlet channels.

Another object of the invention is to provide an improved ceramic, wall-flow monolith particulate filter having a plurality of inlet and outlet channels separated by porous walls wherein a perforated, cookie like sheet of porous ceramic material of a thickness and porosity comparable to that of the porous walls defines porous plugs covering at least the openings of the outlet channels at the inlet end face of the filter.

Still another object of the invention is to provide an improved ceramic, wall-flow particulate filter with porous plugs at the inlet end face thereof wherein the inlet channels and outlet channels are arranged in a pattern whereby the porous plugs of the outlet channels are vertically and horizontally aligned so as to enhance flame propagation across the face of the filter as a result of only spot ignition of particulates collected on the filter.

A further object of the invention is to provide an improved ceramic, wall-flow particulate filter having a plurality of inlet and outlet channels separated by porous walls wherein a perforated, cookie like sheet of porous ceramic material on the inlet end face of the filter defines porous plugs covering the filter inlet end of the outlet channels and also porous flame advance bridges partly covering the inlet end face of the inlet channels whereby to enhance flame advance from the spot igniter of any particulates collected thereon.

For a better understanding of the invention, as well as other objects and features thereof, reference is had to the following detailed description of the invention to be read in connection with the accompanying drawings.

DESCRIPTION OF THE EMBODIMENTS

Figure 1:
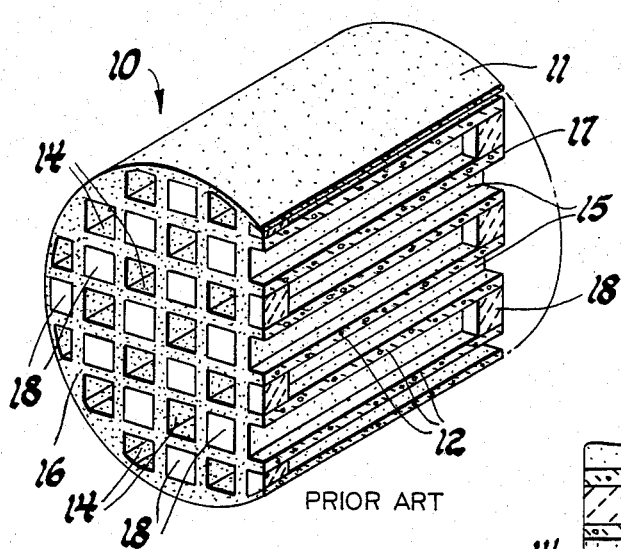
FIG. 1 is a fragmentary, pictorial sectional view showing the construction of a conventional ceramic, wall-flow monolith particulate filter.
Figure 2:
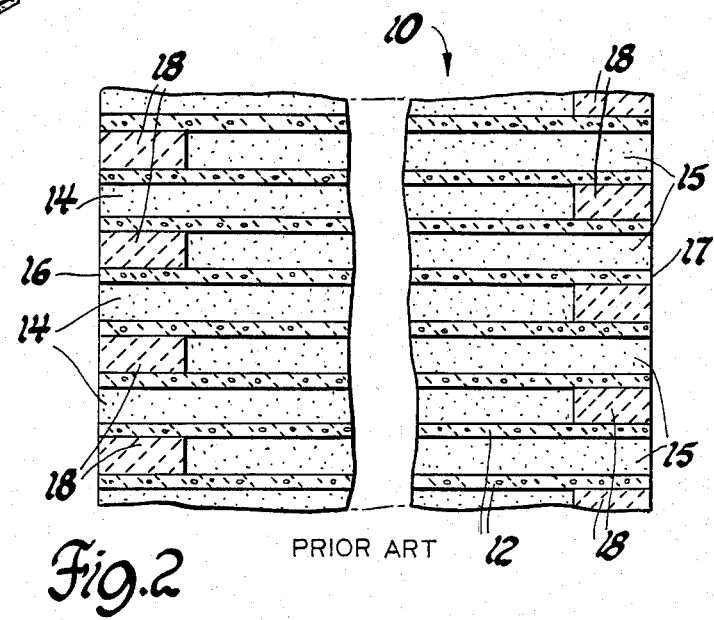
FIG. 2 is a pictorial cross-sectional view of a portion of the conventional filter of FIG. 1.

Referring first to FIGS. 1 and 2, a conventional ceramic, wall-flow particulate filter element, generally designated 10, is provided with a surrounding cylindrical outer wall 11 internally interconnected by a large number of interlaced thin porous internal walls 12. The interlaced walls define internally thereof two groups of parallel passages or channels including respectively inlet channels 14 and outlet channels 15, each extending to opposite ends of the element 10. The inlet channels 14 are open at the inlet end 16 of the element and are closed by non-porous plugs 18 at the outlet end 17 of the element, while the outlet channels 15 are closed by non-porous plugs 18 at the element inlet end 16 and open at the outlet end 17.

In the construction shown, the channels are of square cross-section as best seen in FIG. 1, although, as disclosed in the above-identified U.S. Pat. No. 4,364,761, numerous other configurations could be utilized. Further, the inlet and outlet channels 14 and 15, respectively, are arranged in vertical and horizontal rows (as viewed in cross-section), with the inlet channels 14 alternating with exhaust channels 15 in a checkerboard pattern. Thus, it will be appreciated that each interior wall 12 portion of the element lies between an inlet channel and an outlet channel at every point of its surface except where it engages another wall, as it does at the corners of the channels. So, except for the corner engagement, the inlet channels 14 are spaced from one another by intervening outlet channels 15 and vice versa.

The construction of the ceramic monolith is such that the interior walls 12 are porous so as to permit passage of exhaust gases through the walls from the inlet to the outlet channels. The porosity of the walls is sized appropriately to filter out a substantial portion of the particulates present in diesel exhaust gases. As described in the above-identified U.S. Pat. No. 4,364,761, tests have indicated that efficient filtration is provided by a ceramic wall structure having an average porosity of about 10 percent, a mean pore size of from about 2 to 15 microns in a range of pore sizes of from about 0.5 microns to about 70 microns.

Also as described in the above-identified U.S. Pat. No. 4,364,761, the filter element 10, for example, can be first formed as an extruded open-ended ceramic monolith as used, for example, in catalytic converters, after which the open-ended monolithic structure is converted to a filter element having alternate passages plugged, as previously described, as by closing the ends of alternate passages by depositing at those ends a suitable cement material to form the desired end closing walls or plugs 18 and subsequently hardening the cement. Prior to this invention, all such known plugs have been non-porous plugs, that is, these plugs were made of a suitable material so as to prevent the flow of exhaust gases therethrough. Since these prior art plugs have been made substantially nonpermeable, so as to prevent the flow of exhaust gases therethrough particulates would normally not collect on the inlet face of such filters.

Now in accordance with the subject invention, a porous means is provided on or in the inlet end of a wall-flow ceramic particulate filter whereby particulates can collect thereon to enhance, during incineration, the propagation of a flame across the inlet end face of the filter so as to ignite the particulates in all inlet channels of the filter.

Figure 3:
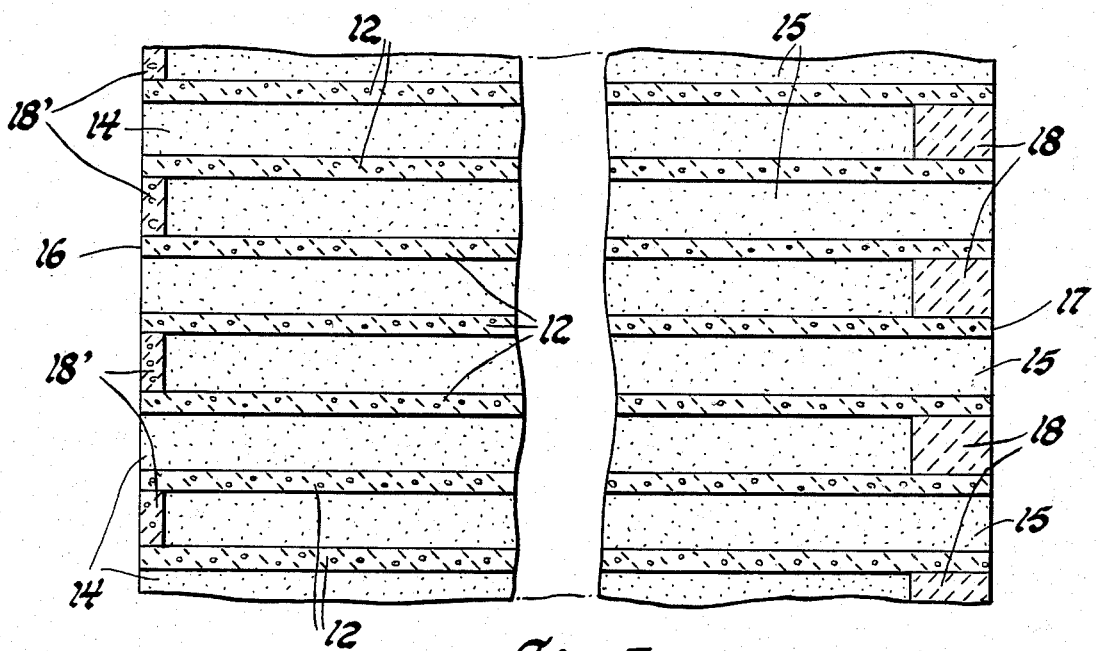
FIG. 3 is a pictorial cross-sectional view, similar to FIG. 2, showing a ceramic wall-flow filter, in accordance with the invention, having porous plugs at the inlet end thereof.

Accordingly, in the filter embodiment shown in FIG. 3, the outlet channels, in accordance with a feature of the invention, are partly closed by porous plugs 18' at the inlet end 16 of the filter. The porous plugs 18' are in the form of actual plugs inserted into the inlet end 16 face openings of the outlet channels 15. For example, these plugs can be formed by means of a thin sheet of green ceramic material of the desired porosity which is placed over the inlet face 16 of the element and then, by the use of a suitable punch die, material is displaced from this sheet into the inlet end openings of the outlet channels 15. Thereafter the ceramic material, forming the plugs, is suitably fired in place, fusing them to their adjacent walls 12. Preferably, as shown in FIG. 3, the plugs 18' have the same thickness and permeability as the filter walls 12 and, preferably, the ceramic material used for the plugs 18' is the same as that used in the fabrication of the wall-flow monolith element.

By the use of these porous plugs 18' in the outlet channels 15 at the inlet end 16 of the filter, the inlet surface of these plugs 18' at the inlet end 16 of the filter element will also serve as a filter means thereby permitting the particulates to be deposited on these inlet faces of the filter element. Thus if the collected particulates of this inlet face are, for example, spot ignited as by a spark from the engine, this particulate burning can now progress across the inlet face of the filter element thereby igniting the particulates in all of the inlet channels of the filter element.

Figure 4:
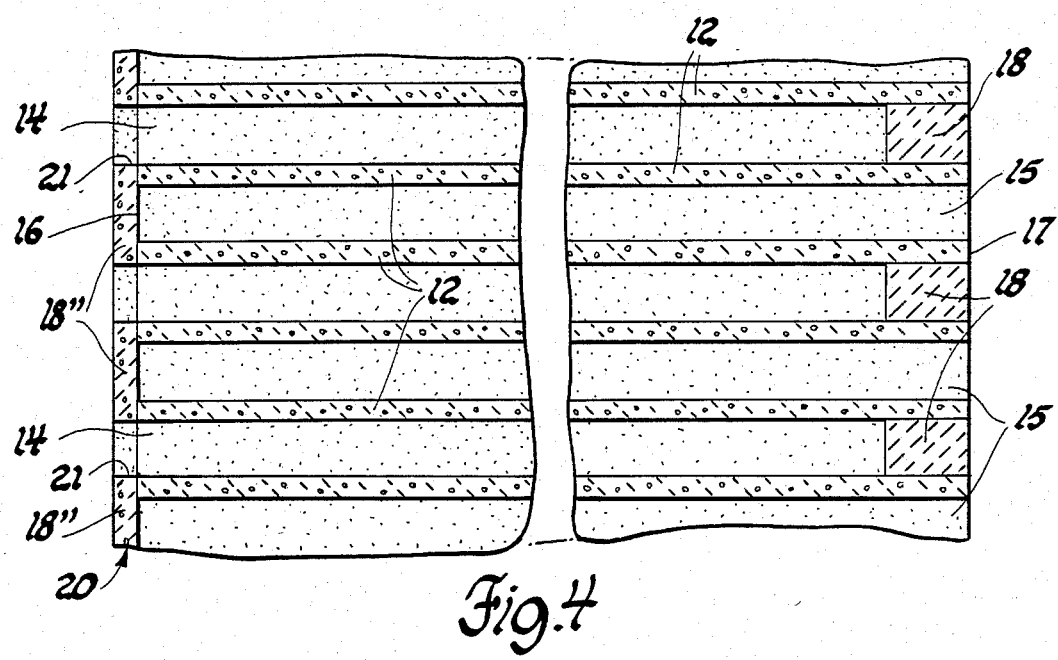
FIG. 4 is a pictorial cross-sectional view of another embodiment of the invention wherein the porous plugs at the inlet end of the filter are provided by means of a perforated, cookie like sheet of porous ceramic material.

Alternatively, instead of forming porous plugs 18' in the manner described above, so as to extend into each of the outlet channels 15 at the inlet end 16 of a filter element, the porous plugs can be in the form of cap plugs positioned to cover over the respective outlet channels 15. Thus as shown in FIG. 4, the porous cap plugs 18" at the inlet end 16 of a filter element can be fabricated by securing a perforated, cookie like plate or sheet 20 of a porous, insulative refractory material, such as a ceramic material, preferably of the same thickness and permeability as the filter walls 12, onto the inlet end of a wall-flow ceramic monolith element. For example, the sheet 20 can be secured to the monolith after both parts have been fired. These parts are then joined together by subsequent firing using a suitable high temperature melting frit which has a melting point less than the two parts being joined.

In the construction shown in FIG. 4, the cookie plate or sheet 20 is provided with spaced apart perforations 21, each of a size and shape conforming to the cross-sectional shape of the associate inlet channels 14 whereby to provide inlet passages for the flow of exhaust gases into these channels, the non-perforated portions of this sheet 20 serving as the cap plugs 18" over the outlet channels 15 at the inlet end 16 of the filter.

Thus for example, the perforations 21' can be arranged in spaced apart configuration with non-perforated portions therebetween so as to provide a conventional checkerboard like porous plug pattern similar to that shown in the filter construction of FIG. 1.

Figure 5:
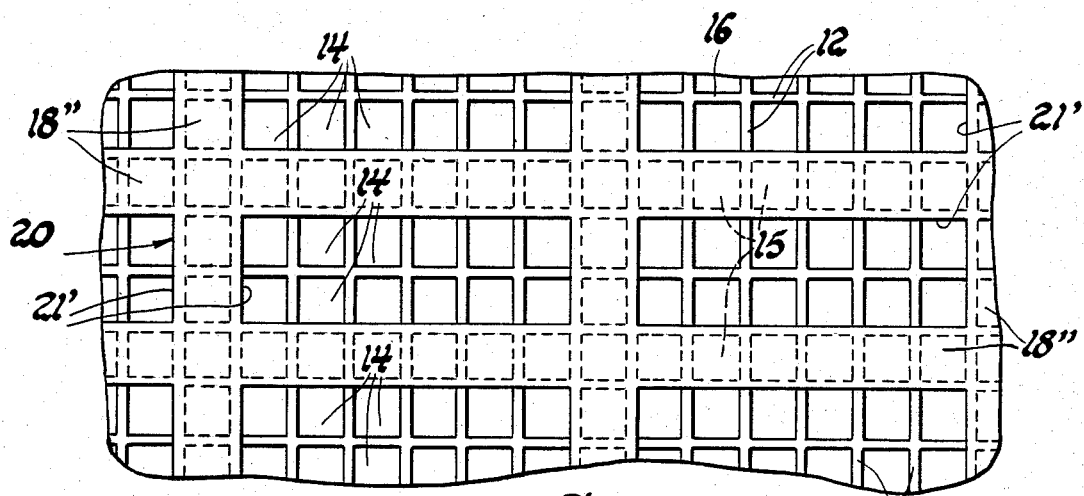
FIG. 5 is a pictorial view of the inlet face of a filter with porous plugs in accordance with the invention, with the inlet and outlet channels of the filter arranged in a pattern whereby the porous plugs are aligned in horizontal and vertical intersecting columns to further enhance flame propagation.

Alternatively, in accordance with another feature of the invention, the cookie like plate or sheet 20 can be perforated to provide a plug pattern of the type shown in the FIG. 5 embodiment of the invention. In this embodiment, the sheet 20 is provided with spaced apart perforations 21' corresponding in size, for example, to two horizontal rows of plural inlet channel 14 openings with the non-perforated cap plug 18" portions thereof arranged in a pattern so as to overlie adjacent outlet channels 15 arranged in horizontal and vertical interconnecting rows.

It should now be apparent that if a porous cap plug pattern is made similar to the plug pattern shown in FIG. 1, the particulates collected on the inlet end porous plug surface of the filter element, after being ignited at a local spot, must burn slowly from one porous plug to the adjacent porous plugs across channel corners. However, with the horizontal and vertical interconnecting porous cap plug 18" pattern of the FIG. 5 embodiment, upon any spot ignition of particulates collected on the inlet face of these plugs, the flame can rapidly advance across the full interconnecting faces of these porous plugs to effect ignition of the particulates in the next adjacent inlet channels. This latter plug pattern is thus operative to allow more rapid complete ignition of the particulates collected even under very low particulate loading levels because of the full interconnecting surfaces of these cap plugs.

However, although continuous intersecting flame advance paths are provided by the porous cap plug 18" pattern of the FIG. 5 embodiment, it will be apparent that the effective filter working area of such a filter element would be substantially reduced because only those walls of an inlet channel 14 separating it from an outlet channel 15 would be operative to separate particulates from the exhaust gas as it flows through such walls into an outlet channel 15.

Figure 6:
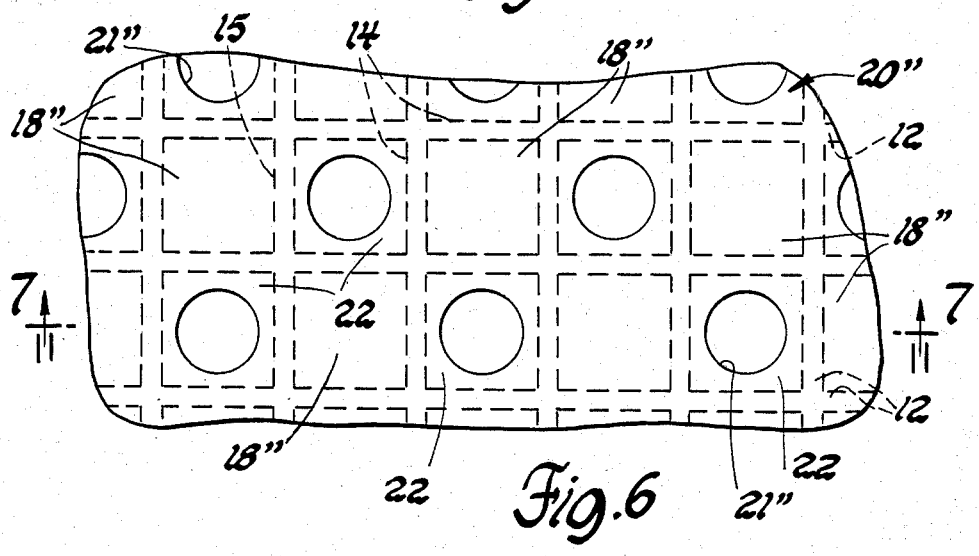
FIG. 6 is a pictorial view of the inlet end face of an alternate first embodiment particulate filter having a perforated, cookie like sheet of porous ceramic material defining, in effect, porous plugs covering the outlet channels and porous flame advance bridges that span the opening of the inlet channels.
Figure 7:
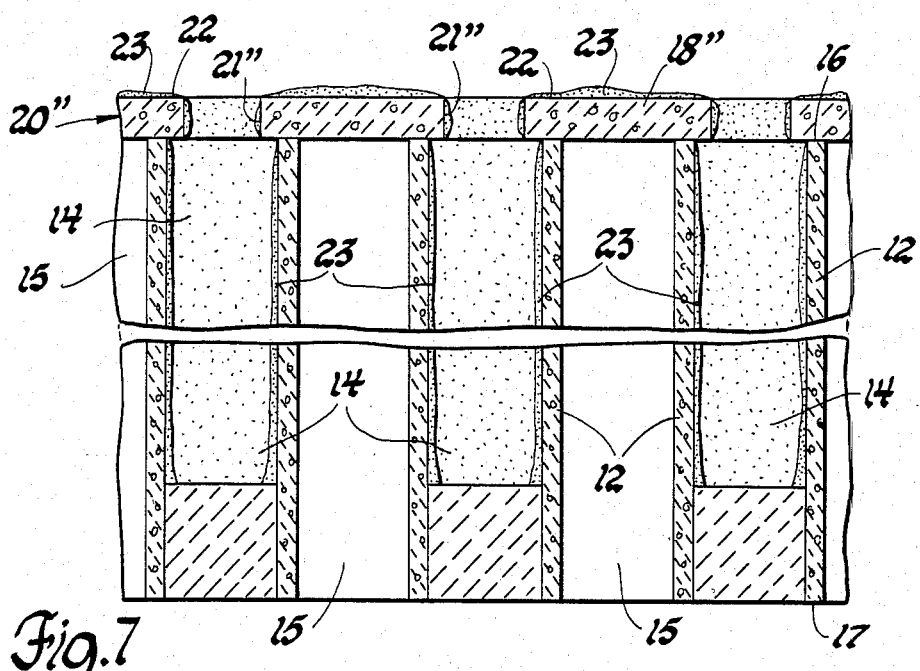
FIG. 7 is a pictorial cross-sectional view of a portion of the filter of FIG. 6 showing how particulates would collect on this inlet face of the filter and on the walls of the inlet channels thereof; and, FIGS. 8 and 9 are pictorial views of the inlet end faces of particulate filters to show alternate flame advance bridge embodiments spanning the openings of the inlet channels thereof.
Figures 8, 9:
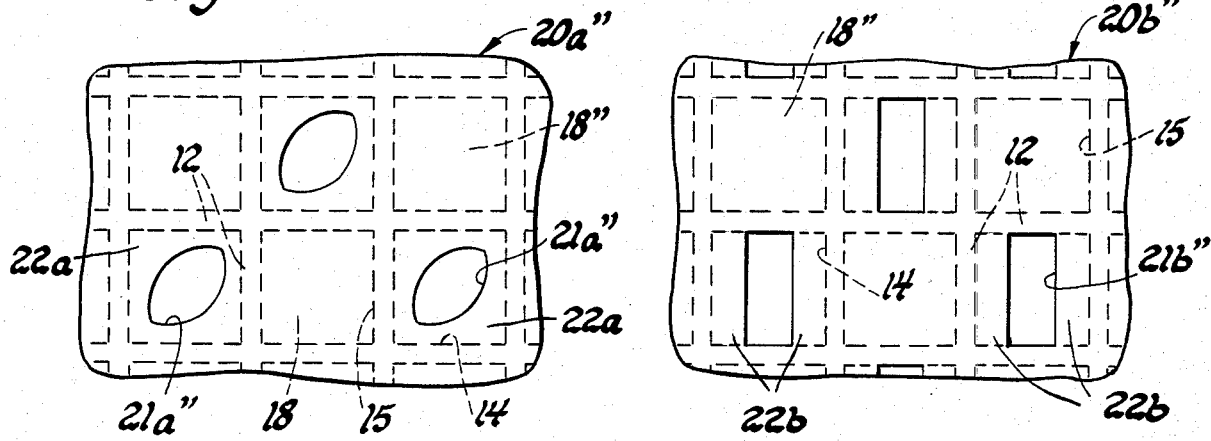

Accordingly, in accordance with preferred embodiments of the invention as shown in FIGS. 6, 7, 8 and 9, the porous refactory plate or sheet 20" is provided with perforations or openings 21" aligned with the inlet channels 14 with these openings being suitably sized so as to be about 40% to 70% of the inlet channel cross-sectional area or opening size. Thus as shown in FIGS. 7 and 8, the sheet 20" is perforated in a suitable pattern so as to provide porous cap plugs 18" extending across the inlet end 16 of the outlet channels 15 and to provide inlet passage 21" for the direct flow of exhaust gases into the inlet channels 14 while still providing porous flame advance bridges 22 that bridge over at least a part of the openings of the inlet channels 14.

Thus in accordance with the construction shown in FIGS. 6 and 7, the sheet 20″ is provided with spaced apart circular openings 21″ arranged so that each such opening 21″ is substantially aligned with the longitudinal axis of an associate inlet channel 14. In this construction, as best seen in FIG. 6, the inlet and outlet channels 14 and 15, respectively, are arranged in checkboard fashion. However, in this FIG. 6 and 7 embodiment, the porous plugs 18″ over the outlet channels 15 are not merely interconnected at their corners as in the FIGS. 3 and 4 embodiments, but are actually interconnected by the substantial interconnecting area of adjacent flame advance bridges 22.

Accordingly, for example, if an engine spark lands on the particulates 23, see FIG. 7, collected on either the surface of the porous plugs 18″ or on a flame advance bridge 22, the resulting flame from the ignited particulates can rapidly advance across the inlet face of the sheet 20″ because of the areas of particulates 23 collected on both the porous plugs 18″ and interconnecting flame advance bridges 22.

Although the openings 21″ in the porous sheet 20″ embodiment of FIGS. 6 and 7 are shown as being of circular configuration, it will be apparent to those skilled in the art that these openings can be of any suitable configuration as desired. Thus by way of examples, the openings 21a″ in the porous sheet 20a″ of the FIG. 8 embodiment are of biconvex configuration with a complementary shaped flame advance bridge 22a encircling each such opening over an inlet channel 14, while the openings 21b″ in the porous sheet 20b″ of the FIG. 9 embodiment are of rectangular configuration and arranged to extend across to opposite walls 12 of an inlet channel 14 so as to define a pair of flame advance bridges 22b on opposite sides thereof that extend across an associate inlet channel 14. As previously described, the openings 21a″ and 21b″ are preferably of a cross-sectional area corresponding from about 40% to 70% of the cross-sectional area of the associate inlet channel 14 of the filter.

Thus for a given engine application, the openings 21′, 21a′ or 21b′ should be sized relative to the cross-sectional flow area of the associate inlet channels 14 in a particular filter embodiment whereby a substantial portion of the exhaust gas discharged by that engine will flow through such openings into the inlet channels 14 so that particulates carried by this exhaust gas will be collected on the walls 12 as the exhaust gas flows therethrough into the adjacent outlet channels 15 for discharge from the filter element.

While the invention has been described with reference to the filter structures disclosed herein, it is not confined to the details set forth, and this application is intended to cover such modifications or changes as may come within the purposes of the improvement or the scope of the following claims.

The embodiments of the invention in which an exclusive property or privilege is claimed are defined as follows:

1. In a through flow exhaust particulate filter element of the type including a ceramic monolith structure having a plurality of thin interlaced gas filtering porous internal walls defining a plurality of parallel passages extending to opposite inlet and outlet ends thereof, said passages including a first group comprising inlet passages open at said inlet end of the element and closed by plugs at the outlet end and a second group comprising outlet passages closed by plugs at said inlet end and open at said outlet end; the improvement wherein at least said plugs of said outlet passages at said inlet end of said element are of a ceramic porous material corresponding in porosity and thickness substantially to that of said porous internal walls whereby said plugs are permeable for exhaust gas flow therethrough so that particulates will also be trapped by said porous plugs to create paths of collected particulates in order to thus permit more rapid flame travel along said porous plugs to adjacent said inlet passages during incineration of collected particulates on the filter element.

2. In a through flow exhaust particulate filter element of the type including a ceramic monolith structure having a plurality of thin interlaced gas filtering porous internal walls defining a plurality of parallel passages extending to opposite inlet and outlet ends thereof, said passages including a first group comprising inlet passages open at said inlet end of the element and closed by plugs at the outlet end and a second group comprising outlet passages closed by plugs at said inlet end and open at said outlet end; the improvement wherein at least said plugs of said outlet passages at said inlet end of said element are defined by a perforated sheet of porous ceramic material, corresponding substantially in thickness and permeability to that of said porous internal walls which is secured to said inlet end of said monolith structure whereby exhaust gases can flow therethrough so that particulates will be traped by said porous ceramic material to thus permit flame travel therealong to adjacent said inlet passages during incineration of collected particulates on the filter element.

3. In a through flow exhaust particulate filter element of the type including a ceramic monolith structure having a plurality of thin interlaced gas filtering porous internal walls defining a plurality of parallel passages extending to opposite inlet and outlet ends thereof, said passages including a first group comprising inlet passages open at said inlet end of the element and closed by plugs at the outlet end and a second group comprising outlet passages closed by plugs at said inlet end and open at said outlet end; the improvement wherein at least said plugs of said outlet passages at said inlet end of said element are defined by a perforated exhaust gas permeable sheet of porous material operatively secured to said inlet end of said monolith structure, said exhaust gas permeable sheet having spaced apart openings therethrough substantially axially aligned with the central axis of said inlet channels, each of said openings having a cross-sectional flow area corresponding to about 40% to 70% of the cross-sectional flow area of an associate inlet channel, said exhaust gas permeable sheet being constructed and arranged such that said porous plugs which close said outlet passages are spaced apart and overlie said outlet channels and also provides spaced apart porous flame advance bridges which are constructed so as to overlie portions of said inlet channels, said exhaust gas permeable sheet being constructed so as to permit exhaust flow therethrough whereby particulates will be collected thereon in paths so that particulate combustion can propagate at a rapid rate across the inlet end face of the filter element.

4. In a through flow exhaust particulate filter element of the type including a ceramic monolith structure having a plurality of thin interlaced gas filtering porous internal walls defining a plurality of parallel passages extending to opposite inlet and outlet ends thereof, said passages including a first group comprising inlet passages open at said inlet end of the element and closed by plugs at the outlet end and a second group comprising outlet passages closed by plugs at said inlet end and open at said outlet end; the improvement wherein at least said plugs of said outlet passages at said inlet end of said element are of a ceramic porous material corresponding in porosity and thickness substantially to that of said porous internal walls whereby exhaust gases can flow therethrough so that particulates will be trapped by said porous plugs to thus permit flame travel along said plugs to adjacent said inlet passages during incineration of collected particulates on the filter element and wherein said outlet passages with said porous plugs are located in both spaced apart vertical and horizontal interconnecting rows with said inlet passages being arranged in at least double rows therebetween in a pattern whereby all of the internal walls defining the outlet passages will be operative to have exhaust gas flowing therethrough.

* * * * *